Feb. 12, 1929.

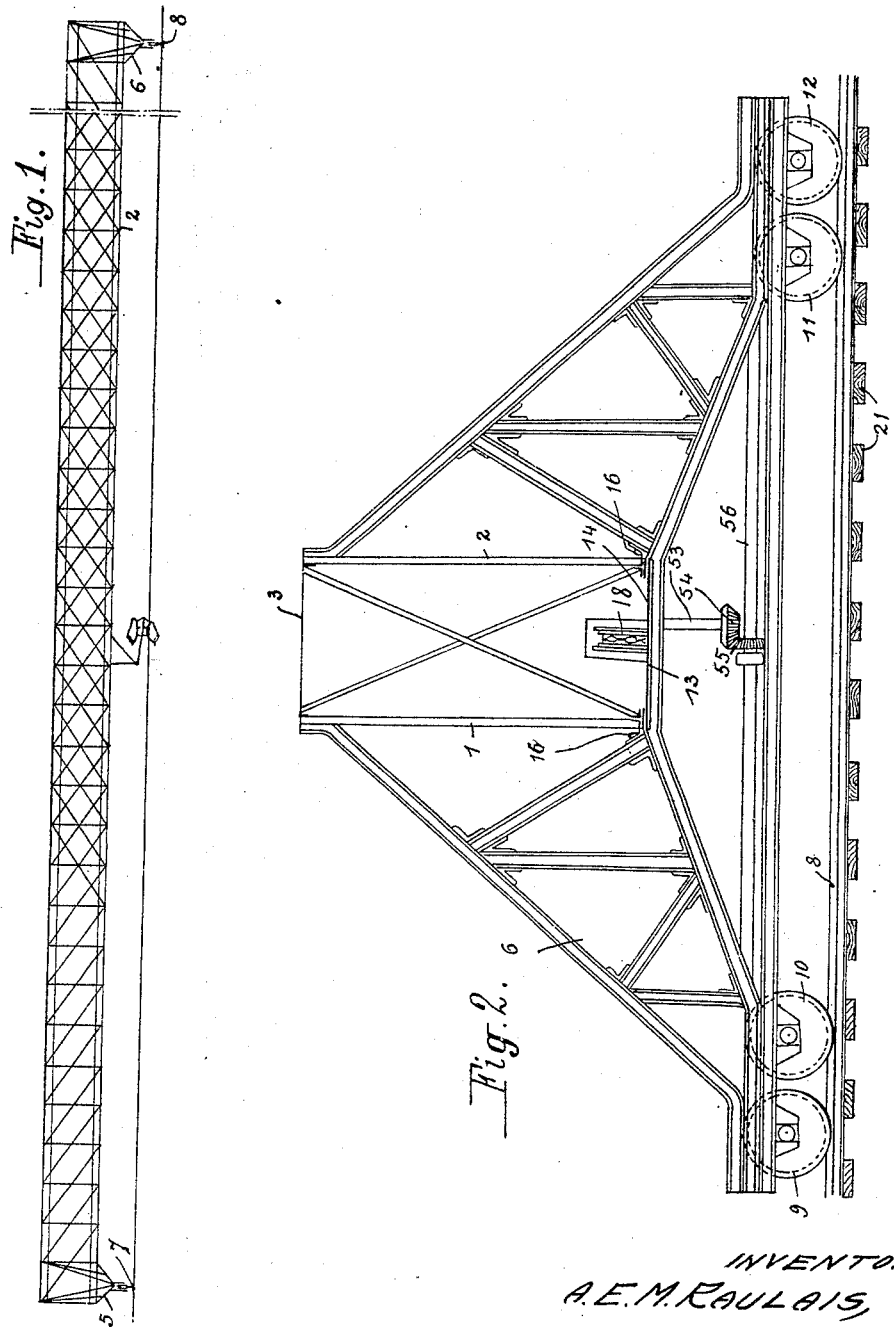

A. E. M. RAULAIS 1,702,018

AGRICULTURAL MACHINERY

Filed June 9, 1926 4 Sheets-Sheet 2

INVENTOR
A. E. M. RAULAIS,
BY Jno Imerie
ATT.

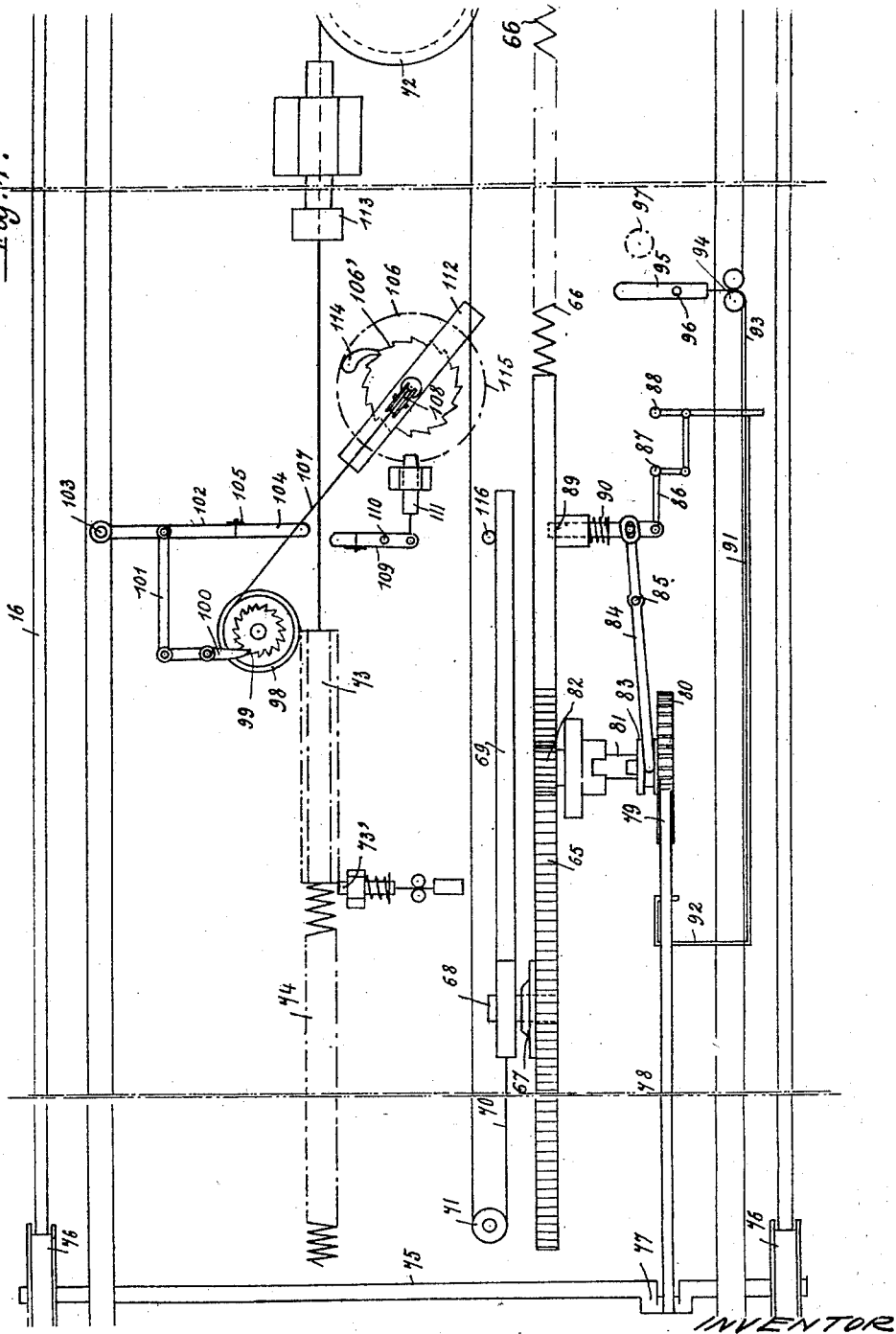

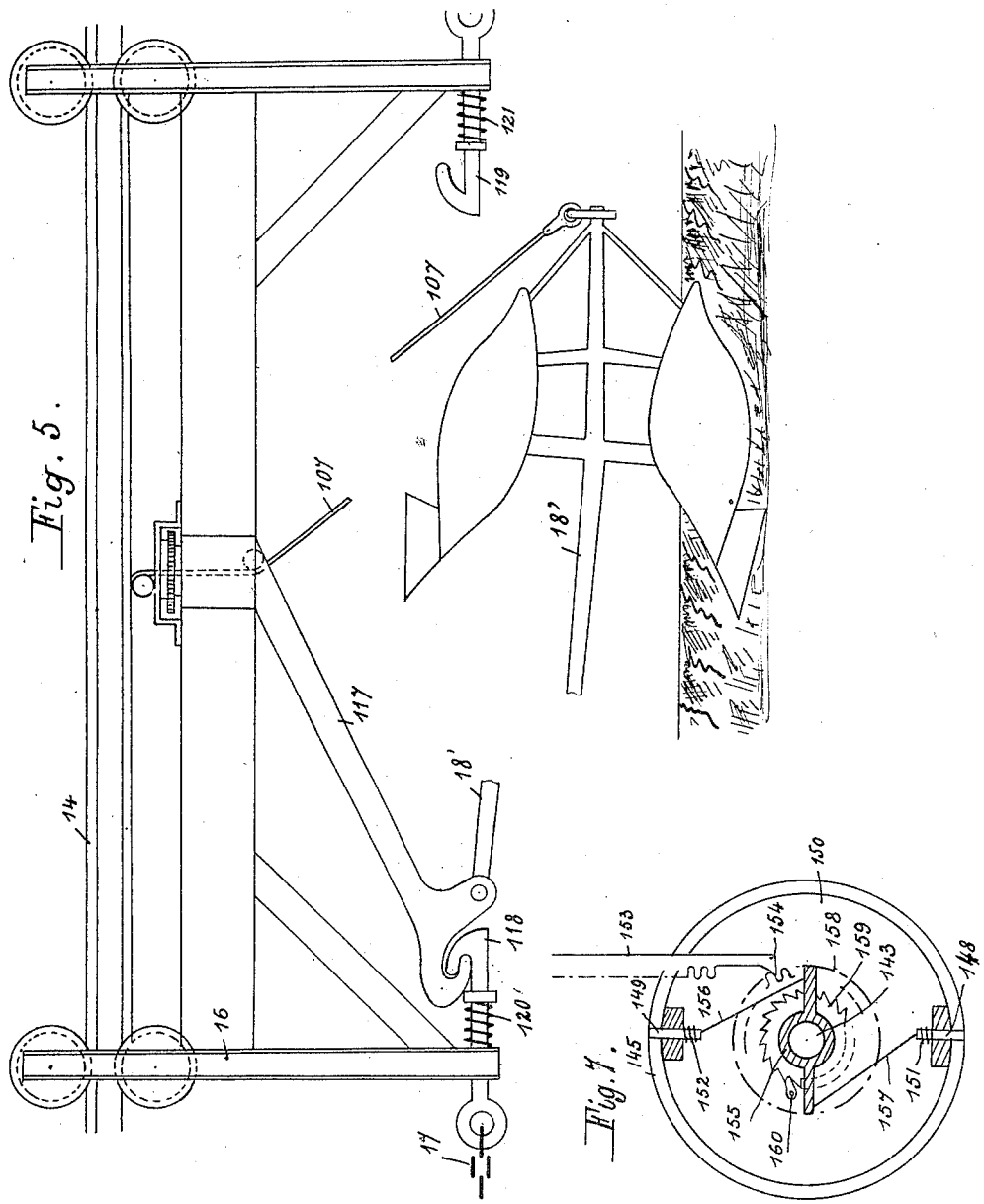

Patented Feb. 12, 1929.

1,702,018

UNITED STATES PATENT OFFICE.

ALEXIS ELIE MAURICE RAULAIS, OF TOULOUSE, FRANCE.

AGRICULTURAL MACHINERY.

Application filed June 9, 1926, Serial No. 114,802, and in France December 24, 1925.

My invention relates to an apparatus for the automatic operation of all types of agricultural machines by external means, and by the mechanism provided in the said apparatus I am enabled to displace the agricultural machine or implement, to draw the said machine in either direction and to turn it about into the working position in whatever direction of travel, all these movements being obtained when desired. My said apparatus further comprises sprinkling means which further the growth of the crops.

The aforesaid movements are automatically obtained in all cases, and the apparatus can be controlled by a single person, whose function is limited to the observation and care of the device.

Since the aforesaid movements are to be effected according to a regular and predetermined system, the mechanism is provided with the necessary elements which act in combination with fixed abutments to produce each movement at the proper time and to limit its amount.

The appended drawings show by way of example various elements of the apparatus according to the invention.

Fig. 1 is a side elevation of the traveling bridge. Fig. 2 is the corresponding end view.

Fig. 4 shows the mechanism for operating the agricultural machines or implements whereby they are inserted into or moved from the ground, and are also turned about.

Fig. 5 is an elevational view of the lower part of the carriage.

Fig. 7 shows the means for controlling implements of an unsymmetrical character.

Figure 3:
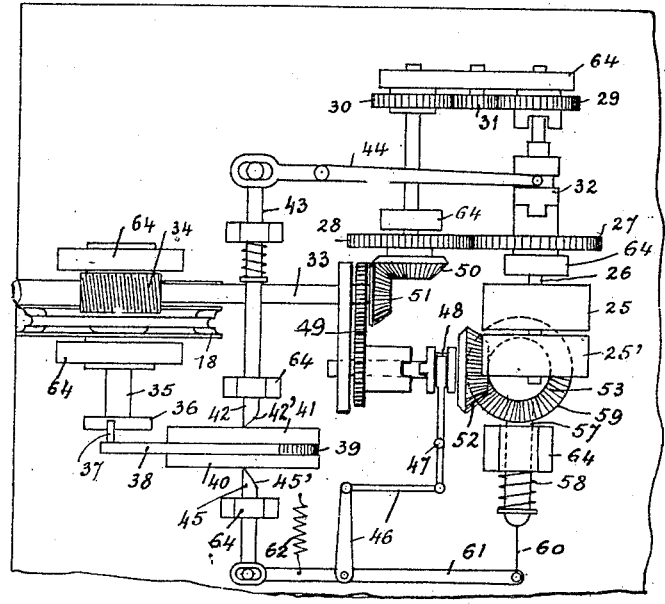
Fig. 3 is a plan view of the mechanism for the travel of the bridge.

In principle, the apparatus consists of two structural girders 1 and 2 which are in vertical and parallel disposition, and are connected together by the upper and lower cross members 3 and 4.

The structure thus formed is mounted upon the side supports 5 and 6 which rest upon the rails 7 and 8 through the medium of the wheels 9, 10, 11 and 12.

The structural elements 1 and 2 are each provided at their lower part with rails 13 and 14 employed for a rolling carriage 16 which serves for the traction of the agricultural implements; said carriage is drawn forward by an endless chain 17 disposed upon two recessed wheels 18 and 19 which are mounted at the respective ends of the apparatus.

The lower part of the said bridge structure is situated about 2 meters above the ground, the height depending upon the height of the crops.

The whole device may be laterally displaced, after each traveling movement of the said carriage, upon the steel rails 7 and 8 which are mounted upon wood ties or upon a half-buried structure consisting of reinforced concrete.

Along the length of the said bridge structure is mounted suitable piping for sprinkling water upon the crops. The water which is supplied by a channel along one of the rails 7 or 8 is pumped into the sprinkling pipes.

At one end of the bridge is mounted the motor 22 actuating the agricultural implement and its carriage, as well as the devices for the motion of the bridge.

The carriage 16 consists of a metallic structure mounted upon wheels which are provided with ball bearings, and it travels upon the rails 13 and 14 along the bridge.

The motor 22 may be of the electric or the thermic type. For electric motors, the current is supplied by an insulated wire which is fed from or wound upon a drum as the apparatus moves forward or back.

Obviously, the bridge is to be employed upon surfaces of ground of all sizes, and will be made larger or smaller according to the case; it will also be modified in shape, depending upon the extent and character of the ground.

Otherwise stated, the bridges may have a widely varying construction, while remaining within the scope of the invention.

The motor 22 drives—through reducing gear—the wheel 18 which is mounted on a horizontal axle and upon which is wound the traction chain 17 for the machines. The wheel 18 may be driven at different speeds, and hence I prefer to employ a continuous current motor with series or shunt field. Herein the motor cabin will contain a starting rheostat and a small switchboard provided with a voltmeter and an ammeter.

The speed of the carriage 16 should be selected to correspond to the power required to drive the implements, for a given area.

The motor usually comprises internal ventilating means whereby all overheating will be prevented in the event of an excessive load.

The normal succession of movements to be obtained is as follows:

When the implement (plow or the like) is at one end of the furrow, it is raised out of the ground, turned about, and then placed in the soil. As soon as the plowing begins, the machine will move normally in the direction of the furrow by an amount corresponding to its size.

For this movement, the chain brings back the said carriage, and then returns to the first position, drawing with it the machine during a part of the course. When this operation is completed, the machine which has now been placed in the proper working position, will commence the next furrow.

The beam is made to travel by the following operation: The carriage 16 is supposed to be at the end of its left hand course (Figs. 3 and 4) and the pulley 24 of the motor 22 is rotating in the clockwise direction; the said pulley will drive the power pulley 25 mounted on the shaft of a speed changing device employing the spur gear wheels 27, 28, 29, 30 and the pinions 31. The sleeve 32 is engaged with the wheel 27; it will be thus observed, considering the direction of rotation of the wheels, that the direction of the motion imparted by the pinions 50—51 to the shaft 33 of the worm 34 actuating the chain wheel 18 will be such that the said carriage will be drawn to the right. The shaft 35 of the wheel 18 carries a disc 36 provided with an eccentric pin 37 controlling the pawl 38 of a ratchet wheel 39 whose faces 40 and 41 are suitably recessed.

The number of teeth of the said ratchet wheel is equal to the number of revolutions made by the wheel 18 during the complete course of the carriage; or twice the length of the path covered during the forward and backward movement required for the forward travel of the bridge.

When the carriage has moved forward and backward as above stated, a locking bolt 42 will enter one of the recesses in the wheel 39, and will bring—by the member 43 pertaining to the rotating shaft 44—the sleeve 32 into engagement with the wheel 29. At the same time an analogous system (bolt 45 and member 46 for the shaft 47) will couple the sleeve 48 to the loose pinion 49, so that the latter will be actuated by the pinion 51 and will thus actuate the pinion 52 driving the shaft 53, and the level gearing 54—55 will thence drive the shaft 56 of the worm driving the power wheels 9—10—11—12 for the bridge.

To regulate these movements of the carriage, it will suffice to dispose the eccentric pin 37 in the proper position and to place the said recess at the suitable points. By these modifications, the carriage will be caused to travel from right to left while the bridge moves forward.

When these two movements—which can be regulated in advance—are completed, an arm 57 which is urged by the spring 58 will drop into a recess in the disc 59 mounted on the shaft 53 thus effecting—by the members 60—61 and 46—the uncoupling of the pinion 52 whereby the bridge will be stopped. At the same time the arm 45 will leave the recess of the disc 40 in which it was engaged and the arm 42 will act in like manner relatively to the recess of the plate 41. As concerns the arms 42 and 45, this motion will be effected by means of their ramps 42' and 45'. When this operation is terminated, the bridge will occupy the fixed position (uncoupling of the pinion 52) and the carriage will return from left to right (coupling of 32 with the wheel 27) until the arm 42 falls into the next recess in the disc 41.

The said recesses are so disposed that this movement will be solely produced, so that the carriage will cover the whole length of the bridge; when it attains the other end, the same movements will take place in the order stated but in the inverse direction.

Obviously, if the amount of the movements will not permit of disposing the recesses on a given periphery of the discs, the latter will comprise helical ramps in the inverse direction (of the worm type) coacting with the said arms, and the said ramps will be recessed at the proper places.

In order that all of the aforesaid movements shall be automatically performed, I provide the reaction spring 62, 63 in the necessary places, as well as the bearings 64 whereby the functioning of the rotating parts is facilitated.

I may reverse the motion of the said carriage by a reversing switch which is actuated at the proper time by suitable tappets.

The apparatus may be stopped either by breaking the circuit or by placing the belt upon a loose pulley 25', or by adjusting the wheel 39 so that the sleeve 32 will constantly occupy the uncoupling position.

The second operation of the apparatus is the removal of the plowshares (or the like) from the ground, the turning of the plow, and the insertion of the plowshares in the ground when the implements or machines have reached the ends of the bridge.

The device for this purpose is mounted upon the bridge itself, as shown in Fig. 4, and it comprises a rack 65 which is urged out of its recess by a spring 66; said rack having a shoulder 67 in which is slidable the arm 68 which normally actuates the slide 69 controlling a cable 70 which is connected at one end (after passing over the supporting pulleys 71—72) with the double rack 73 urged by the spring 74. The shaft 75 of the wheels 76 of the carriage 16 carries the crank 77 which—through the connecting member 78—actuates the pawl 79 of a ratchet 80 whose shaft 81 carries a loose wheel engaging the rack 65. A coupling sleeve 83 mounted on the shaft 81 is actuated by a lever 84 disposed on the axle or fulcrum 85 whose outer end is secured to the member 86 pertaining to the shafts 87 and 88; said member carries at one end an arm provided with a reaction spring 90 and at the other end the device 91 controlling a hook 92 which uncouples the rod 78. The outer end of the member 86 is connected by a cable 93—disposed on the supporting fork 94—to an abutment 95 revoluble on an axle 96. At 97 is shown an abutment pertaining to the bridge.

The double rack 73 engages on the one hand with the ratchet wheel 98 provided with the pawl 99 whose arresting member 100 is mounted on a driving piece 101 secured to an arm 102 mounted on the shaft 103 and whose lower part is hinged at 105 and can pivot only in one direction, and on the other hand with the wheel 106 actuating the plow cable 107.

The carriage 16 is supposed to be traveling in the direction of the arrow (Fig. 4); the wheels 76 actuate—through their shaft 75 provided with the crank 77—the pawl 79 which drives the pinion 82, through the medium of the ratchet wheel 80 and the sleeve 83 which is now coupled. The rack 65 is now brought gradually to the left. When the latch 89 drops into the recess in the rack 65, the bolt 68 will also drop into its recess in the slide 69, thus connecting it with the rack. The spring 66 is now stretched to the maximum. While this double locking is taking place, the pawl 79 is lifted by the hook 92 and no longer engages the wheel 80. In this position (Fig. 4) the spring is stretched ready for action.

The abutment 95 will meet the tappet 97 at the desired point for stopping the plow; the latch 89 is now withdrawn from its recess in the rack 65; the spring 66 will draw upon the rack, so that the slide 69 will actuate the cable 70.

The said cable draws forward the double rack 73, while setting its spring 74 in position. The wheel 98 which is first actuated will draw forward the cable 107 which will raise the plow, passing over the pulley 108. At this time the rack 73 will actuate the tappet 109 pivoted on the axle 110 and consisting of two parts which are hinged like the arm 102. The ratchet wheel 106 provided with the pawl 106' will now be released from the latch 111 which held it, and said wheel is actuated by the pawl 114 of the wheel 115 which latter is now actuated by the rack 73, and is loose on its shaft; the sleeve 112 carrying the pulley 108 remains in the fixed position.

The arm 117 secured to the wheel 106 and guiding the cable 106 now commences to rotate, drawing forward the plow, and this motion continues by inertia until the device rotates through 180 degrees, at which point it is again held. The rack 73 then makes contact with a buffer 113 and is brought back by its spring 74; it is disengaged from the latch 111 which now holds the wheel 106 after its half revolution and at the same time releases the pawl 100, so that the plowshare (or like parts) can now drop into the ground by the weight acting on the cable 107 which can now freely unwind; it is then released from the wheel 115 and then from the pawl 100, and returns to the starting position.

The action of the spring 74 perponderates when the slide 69—in its movement under the effect of the spring 66—meets with the abutment 116 which acts upon the arm 68 so as to release the slide 69 from the rack 65.

73' is a latch for stopping the rack 73.

When the carriage is to travel upon the whole length of the bridge, the arrangement of the abutments is such that their action will be exercised during its travel only once in two passages in a given direction.

For smaller distances of travel, the action is exercised at each passage in a given direction, and there will be no action in the other direction.

The implement (plow or the like) as well as the carriage are drawn forward by the hooks 118—119 provided with the compression spring 120, 121 upon which the chain 17 acts in turn, and to which are attached in turn the end of the arm 117; the elastic traction on the hooks assures a reliable connection with the arms.

Figure 6:
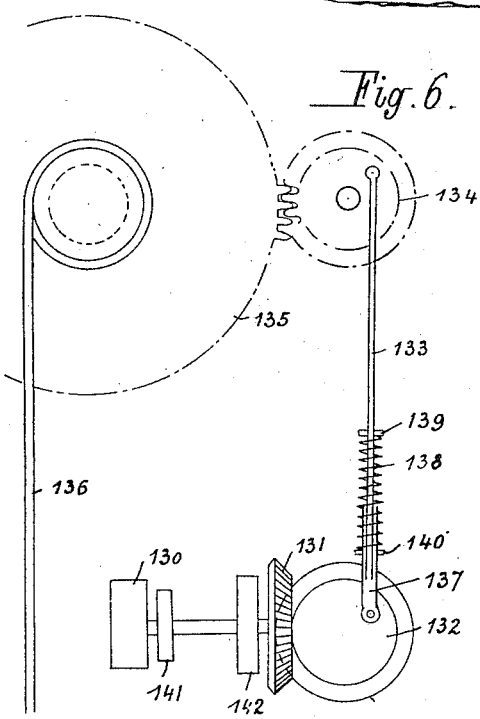
Fig. 6 shows the arrangement for the automatic winding and unwinding of the insulated electric cable.

In order that the insulated electric cable shall follow the movements of the carriage (Fig. 6), the pulley 130 is permanently connected with the shaft 53 (Fig. 3) actuating the driving wheels 9—10—11—12. When the bridge moves in one or the other direction the shaft 53 actuates the pulley 130, which drives the gear wheels 131 and 132 (Fig. 6). The gear wheel 132 actuates—through the medium of the link 133 the gear wheel 134 engaging a toothed disc mounted on the drum 135 for winding the electric cable 136. The link 133 is engaged in a guide 137, and a spring 138 secured to the rings 139 and 140 connects these two members together; 141 and 142 are two bearings.

According to this arrangement, the movement of the bridge will correspond to the movement of the drum 135, and since the cable 136 is wound in an irregular manner on the said drum, the spring 138 will yield when the cable offers a resistance to the winding which counteracts the effect of the link 133. Obviously, the pulley 130 will be rotated in the proper direction, and the spring 138 will have a suitable power.

Figure 8:
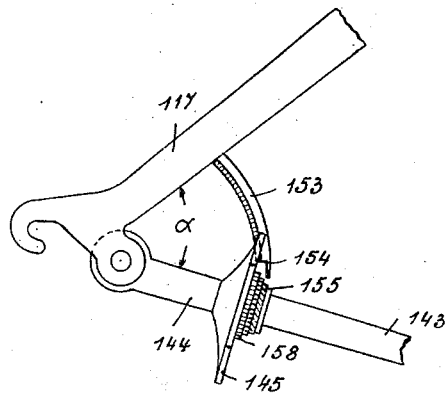
Fig. 8 is a view similar to Fig. 7.

In the case of implements having an unsymmetrical disposition, such as plows or the like, it is required for flat working that the implements shall comprise two superposed parts, i. e. the implements will be of the double type. The machines are turned about at each end of the furrow by the following means (Figs. 7 and 8).

The beam 143 of the plow or the like is engaged in the sleeve 144 which is secured to the arm 117; said sleeve carries a disc 145 having two notches (an upper and a lower notch) coacting with the respective latches 148, 149 mounted on a disc 150 secured to the plow beam 143 and adapted for engagement with the disc 145. The said latches are maintained in their notches by the springs 151, 152. The arm 117 carries a rack 153 whose lower part forms a projection 154 directed towards the plow beam.

When the plow is at the end of the furrow and is raised by the cable 107 (Fig. 5) the angle α will be diminished; the end part 154 pushes the collar 155 and the latches are withdrawn by the cables 156—157. Continuing its action, the rack 153 engages the gear wheel 158 which is loose on its shaft, but actuates the ratchet wheel 159, mounted on the plow, by means of the pawl 160. When the plow has been turned about, the latches 148—149 engage in the notches, thus stopping the rotation of the plow. The rack 153 will not act upon the collar in the contrary direction, since this is not allowed by the hinge, so that the plow is ready to proceed upon the next furrow, and so on for each reversal.

In the interior of the bridge are disposed at suitable distances apart the rollers maintaining the traction chain whereby all friction between the chain and the structure will be prevented.

Obviously, at the end of the bridge opposite the end at which the motor is mounted, I dispose the said chain wheel as well as the devices used for the forward travel of the apparatus.

It should be understood that all the parts herein described can be replaced by equivalent parts having the same functions and of types employed in current practice.

Furthermore, the scope of my said apparatus is not limited to the use of a single bridge, but according to the surface of the ground I may use one or more bridges in the parallel position, and herein the apparatus will be displaced upon two rolling platforms, employing a narrow gauge transverse track, upon which the apparatus is moved and is transported to the point coinciding with the track upon which it is to be used.

At the ends of the field, at which there may be situated grapevines mounted on stakes, fruit trees or the like, should the alternate motion of the carriage—due to its oblique forward movement—offer prejudice to such crops or trees, I obviate this defect by providing a special cable for the forward motion of the apparatus.

I claim:

1. A constructional form of the said apparatus, comprising two structural bridge frames or girders placed vertically in the parallel position and suitably cross-braced, said girders resting by means of lateral supports upon a truck traveling upon rails, each girder carrying internally and externally one of the rails for a traveling carriage which is actuated by an endless chain coacting with a pair of recessed chain wheels mounted at the respective ends of the apparatus, an electric motor with internal air cooling and comprising suitable accessories whereby one of the said chain wheels may be driven at reduced speed, a reversing device comprising a sleeve and gear wheels actuated by the electric motor and driving bevel and worm gearing engaging the said chain wheel which actuates an adjustable eccentric controlling by means of a pawl a ratchet wheel which is recessed on either side; a locking bolt being adapted to engage one of the recesses on one side of the wheel for actuating the reversing device, and a second locking bolt being adapted to engage one of the recesses on the other side of the wheel whereby the shaft of the said worm will be coupled to the gear for driving apparatus, the said apparatus being stopped by means of a spring latch which is mounted upon gear secured to the said clutch and which by coacting with a recess in a disc on the main shaft controlling the driving wheels of the apparatus will uncouple the said locking bolts from their recesses in the sides of the ratchet wheel.

2. A constructional form of the said apparatus comprising two structural bridge frames or girders placed vertically in the parallel position and suitably cross-braced, said girders resting by means of lateral supports upon a truck traveling upon rails, each girder carrying internally and externally one of the rails for a traveling carriage which is actuated by an endless chain coacting with a pair of recessed chain wheels mounted at the respective ends of the apparatus, an electric motor with internal air cooling and comprising suitable accessories whereby one of the said chain wheels may be driven at reduced speed, the said carriage comprising a rack controlled by a reaction spring and provided with a shoulder coacting with a stud which controls a notched slide actuating the cable of a double rack controlled by a reaction spring, the wheels of said carriage actuating—by crank, link and pawl—a ratchet wheel whose shaft carries a coupling sleeve as well as a pinion coacting with the first-mentioned rack, the said sleeve being controlled by suitable gearing and carrying a spring latch coacting with a recess in the said rack, a cable attached to a pivoted lever which controls the uncoupling of the link when it meets the abutment of the bridge, the double rack actuating on the one hand the ratchet wheel controlling the cable which serves to raise the agricultural implement, whereof the stopping pawl is secured to gear mounted on an arm oscillating in a single direction which is also actuated by the double rack, and on the other hand the wheel actuating by a pawl the wheel pertaining to the traction cable for the agricultural implement as well as its locking bolt operating in a single direction, the controlling ratchet wheel carrying an arm whereby the cable of the agricultural implement is guided the stroke of the rack being limited by a shock absorbing device the said rack then proceeding to the rear as far as its abutment under the action of its spring, when the slide which controls it meets an abutment which releases it from the first-mentioned rack.

3. A constructional form of the said apparatus, comprising two structural bridge frames or girders placed vertically in the parallel position and suitably cross-braced, said girders resting by means of lateral supports upon a truck traveling upon rails, each girder carrying internally and externally one of the rails for the travelling carriage which is actuated by an endless chain coacting with a pair of recessed chain wheels mounted at the respective ends of the apparatus, an electric motor with internal air cooling and comprising suitable accessories whereby one of the said chain wheels may be driven at reduced speed, the said carriage comprising a rack controlled by a reaction spring and provided with a shoulder coacting with a stud which controls a notched slide actuating the cable of a double rack controlled by a reaction spring, the wheels of said carriage actuating—by crank, link and pawl—a ratchet wheel whose shaft carries a coupling sleeve as well as a pinion coacting with the first-mentioned rack, the said sleeve being controlled by suitable gearing and carrying a spring latch coacting with a recess in the said rack, a cable attached to a pivoted lever which controls the uncoupling of the link when it meets the abutment of the bridge, the double rack actuating on the one hand the ratchet wheel controlling the cable which serves to raise the agricultural implement, whereof the stopping pawl is secured to gear mounted on an arm oscillating in a single direction which is also actuated by the double rack, and on the other hand the wheel actuating by a pawl the wheel pertaining to the traction cable for the agricultural implement as well as its locking bolt operating in a single direction, the controlling ratchet wheel carrying an arm whereby the cable of the agricultural implement is guided, the stroke of the rack being limited by a shock absorbing device, the said rack then proceeding to the rear as far as its abutment under the action of its spring, when the slide which controls it meets an abutment which releases it from the first-mentioned rack, the arm guiding the cable of the agricultural implement being adapted to drop at each half-revolution into hooks controlled by spiral springs which are mounted on the said carriage.

4. A constructional form of the said apparatus, comprising two structural bridge frames or girders placed vertically in the parallel position and suitably cross-braced, said girders resting by means of lateral supports upon a truck traveling upon rails, each girder carrying internally and externally one of the rails for the travelling carriage which is actuated by an endless chain coacting with a pair of recessed chain wheels mounted at the respective ends of the apparatus, an electric motor with internal air cooling and comprising suitable accessories whereby one of the said chain wheels may be driven at reduced speed, an electric cable supplying current to the said carriage, a pulley connected with the shaft actuating the driving wheels of the apparatus and actuating level gearing whereof one wheel carries a link coacting with a gear wheel engaging a like wheel mounted on the cable drum through the medium of a spring mounted in a guiding sleeve.

5. A constructional form of the said apparatus, comprising two structural bridge frames or girders placed vertically in the parallel position and suitably cross-braced, said girders resting by means of lateral supports upon a truck traveling upon rails, each girder carrying internally and externally one of the rails for the traveling carriage which is actuated by an endless chain coacting with a pair of recessed chain wheels mounted at the respective ends of the apparatus, an electric motor with internal air cooling and comprising suitable accessories whereby one of the said chain wheels may be driven at reduced speed, the said carriage comprising a rack controlled by a reaction spring and provided with a shoulder coacting with a stud which controls a notched slide actuating the cable of a double rack controlled by a reaction spring, the wheels of the said carriage actuating—by crank, link and pawl—a ratchet wheel whose shaft carries a coupling sleeve as well as a pinion coacting with the first-mentioned rack, the said sleeve being controlled by suitable gearing and carrying a spring latch coacting with a recess in the said rack, a cable attached to a pivoted lever which controls the uncoupling of the link when it meets the abutment of the bridge, the double rack actuating on the one hand the ratchet wheel controlling the cable which serves to raise the agricultural implement, whereof the stopping pawl is secured to gear mounted on an arm oscillating in a single direction which is also actuated by the double rack, and on the other hand the wheel actuating by a pawl the wheel pertaining to the traction cable for the agricultural implement as well as its locking bolt operating in a single direction, the controlling ratchet wheel carrying an arm whereby the cable of the agricultural implement is guided, the stroke of the rack being limited by a shock absorbing device, the said rack then proceeding to the rear as far as its abutment under the action of its spring, when the slide which controls it meets an abutment which releases it from the first-mentioned rack, the arm guiding the cable of the agricultural implement being adapted to drop at each half-revolution into hooks controlled by spiral springs which are mounted on the said carriage, a sleeve pivoted at the end of the controlling arm and in which is engaged the control of the agricultural implement, and carrying a disc having two notches coacting with latches mounted on a disc secured to the said control and urged into their recesses by springs, an oscillating rack acting in a single direction which is mounted on the said arm and carries at the bottom an abutment turned towards the control for the agricultural implement, said abutment pushing in the first place a collar releasing the said latches from their corresponding notches before the said rack actuates a loose wheel whose pawl acts in a single direction upon a wheel mounted on the same shaft and connected with the agricultural implement.

6. Agricultural machinery including a supporting bridge adapted for bodily travel on a trackway, a carriage adapted for travel longitudinally of the bridge, means on the carriage to be connected to an agricultural implement, means on the carriage for raising the implement from the ground and reversing the same, operating means on the carriage for actuating the elevating and reversing means including springs, and means operated in the movement of the carriage on the bridge for tensioning said springs.

7. An agricultural machine including a bridge adapted for travel on a trackway, a carriage mounted for movement longitudinally of the bridge, implement draft means mounted on the carriage, means on the carriage for lifting and reversing the implement draft means at a predetermined point in the travel of the carriage, said means including a cable for lifting the draft means, an arm forming part of the draft means, a wheel to move the arm through an arc of 180°, and a rack for operating the cable and said wheel in succession, a spring for operating the rack, means operated in the travel of the carriage for tensioning the spring, and a member engaged at a predetermined point in the travel of the carriage for releasing the spring for operation.

Signed at Bordeaux, France, this tenth day of May, A. D. 1926.

ALEXIS ELIE MAURICE RAULAIS.